United States Patent
Chen

(10) Patent No.: US 9,167,902 B1
(45) Date of Patent: Oct. 27, 2015

(54) ONE-PIECE OFFICE CHAIR IN THREE DIMENSIONS

(71) Applicant: Yung-Hua Chen, Taoyuan (TW)

(72) Inventor: Yung-Hua Chen, Taoyuan (TW)

(*) Notice: Subject to any disclaimer, the term of this patent is extended or adjusted under 35 U.S.C. 154(b) by 0 days.

(21) Appl. No.: 14/677,104

(22) Filed: Apr. 2, 2015

Related U.S. Application Data

(63) Continuation-in-part of application No. 14/320,759, filed on Jul. 1, 2014.

(51) Int. Cl.
| | | |
|---|---|---|
| *A47C 7/44* | (2006.01) | |
| *A47C 3/30* | (2006.01) | |
| *A47C 1/032* | (2006.01) | |
| *B60N 2/68* | (2006.01) | |
| *A47C 5/12* | (2006.01) | |
| *B60N 2/20* | (2006.01) | |
| *A47C 7/02* | (2006.01) | |

(52) U.S. Cl.
CPC ............. *A47C 7/44* (2013.01); *A47C 1/03255* (2013.01); *A47C 1/03272* (2013.01); *A47C 3/30* (2013.01); *A47C 5/12* (2013.01); *A47C 7/443* (2013.01); *B60N 2/20* (2013.01); *B60N 2/68* (2013.01); *A47C 7/02* (2013.01)

(58) Field of Classification Search
CPC .......... A47C 1/03255; A47C 1/03261; A47C 1/032; A47C 1/024; A47C 1/03272; A47C 3/30; A47C 3/00; A47C 3/01; A47C 5/12; A47C 7/282; A47C 7/443; A47C 7/46; A47C 7/02; A47C 7/40; B60N 2/68; B60N 2/682; B60N 2/22; B60N 2/20
USPC ............... 297/452.11, 452.18, 289, 299, 285, 297/314, 302.4, 296, 297, 298, 316, 326
See application file for complete search history.

(56) References Cited

U.S. PATENT DOCUMENTS

| | | | | |
|---|---|---|---|---|
| 4,361,357 | A | * | 11/1982 | Pollock .......................... 297/297 |
| 4,364,887 | A | * | 12/1982 | Becht et al. ................... 264/166 |
| 4,380,352 | A | * | 4/1983 | Diffrient ......................... 297/61 |
| 4,889,385 | A | * | 12/1989 | Chadwick et al. .......... 297/300.1 |
| 4,966,411 | A | * | 10/1990 | Katagiri et al. ............. 297/300.7 |
| 6,726,286 | B2 | * | 4/2004 | Stumpf et al. ............ 297/452.64 |
| D500,614 | S | * | 1/2005 | Chen ........................... D6/716.3 |
| D509,387 | S | * | 9/2005 | Chen .......................... D6/708.23 |
| 7,159,943 | B2 | * | 1/2007 | Costaglia ...................... 297/323 |
| 7,637,570 | B2 | * | 12/2009 | Becker et al. ................. 297/314 |
| 7,654,616 | B2 | * | 2/2010 | Kinoshita et al. ......... 297/452.56 |
| 7,887,138 | B2 | * | 2/2011 | Chen ........................ 297/452.18 |
| 8,029,060 | B2 | * | 10/2011 | Parker et al. ............... 297/300.1 |
| 8,113,586 | B2 | * | 2/2012 | Chen ........................... 297/303.5 |
| 8,469,454 | B2 | * | 6/2013 | Holt et al. ................. 297/452.63 |
| 2005/0280300 | A1 | * | 12/2005 | Tin ............................. 297/300.3 |
| 2007/0267911 | A1 | * | 11/2007 | Kinoshita et al. ......... 297/452.18 |
| 2008/0252124 | A1 | * | 10/2008 | Chen ........................... 297/301.4 |

* cited by examiner

*Primary Examiner* — David R Dunn
*Assistant Examiner* — Matthew Gitlin
(74) *Attorney, Agent, or Firm* — Rosenberg, Klein & Lee

(57) ABSTRACT

A one-piece office chair in three dimensions made of composite plastic materials with an adjusting apparatus comprises a middle axle seat, a seat frame, a back frame, and two armrests, all of which are formed in one-piece to complete the entire chair frame. Also, an adjusting apparatus is applied to provide supports and elasticity for the chair frame, enabling the back frame to adjust the angle in accordance with users' movements. With the dynamic design and the resilience of the materials, the present invention further allows sideway movements in three-dimensional angles by having the back frame and the seat frame adjusting the angle from a middle axle seat thereof; meanwhile, the back frame thereof also allows lying back movement, featuring the present invention a comfortable seating in every angle.

6 Claims, 10 Drawing Sheets

ONE-PIECE OFFICE CHAIR IN THREE DIMENSIONS

This patent application is a continuation-in-part of Ser. No. 14/320,759 filed on Jul. 1, 2014, currently pending.

BACKGROUND OF THE INVENTION

1. Field of the Invention

The present invention relates to an office chair in three dimensions, particularly to one that is formed in one-piece structure of composite plastic materials with an adjusting apparatus.

2. Description of the Related Art

A conventional office chair 10 as shown in FIGS. 1A and 1B comprises an underframe portion 11, a seat portion 12, a back portion 13 and two armrests 14, among which the seat portion 12 is the key to be composed with other components. The seat portion 12 of a conventional office chair 10 includes a metal plate 121 combining with a seat pad 122, and the bottom thereof combines a supporting device 123 to mount on a middle column 111 of the underframe portion 11. Besides, the metal plate 121 links up two connection seats 124 on both left and right sides to fix on the armrests 14. With such structure of multi components combination, a conventional office chair 10 is constructed in a complicated method whereby the finished product lacks unity and firmness, plus the heavy weight of metal materials; there is still room for improvements.

On the other hand, a conventional chair made of plastic has a lightweight advantage but the simple structure is more suitable for outdoor activities than offices.

FIGS. 2A and 2B illustrated a one-piece structure of a conventional office chair disclosed in the U.S. Pat. No. 7,887, 138. The seat base 10a of the invention is made of one-piece plastic material and mainly comprises a middle axle seat 101, a claw member 102 with a plurality of arched supporting arms 103 extending upwards from the rim of the middle axle seat 101 in the shape of claws, and a base frame 104 formed at the top of the supporting arms 103 of the claw member 102. Such structure features the invention an easy and rapid assembly with stable structure and light weight. However, the arched supporting arms 103 are arranged all over under the base frame 104, resulting the invention in a rigid status without ant flexibility.

Also, the U.S. Pat. No. 7,637,570 disclosed a chair invented by Wilkhahn that has a seat and a seat mechanism, where the seat mechanism includes two supporting arms arranged on both sides of the chair and functioning individually, and the seat is fixed on the supporting arms so that when the seat is tilting sideways, the other side would not be influenced and lose balance. However, the invention includes a plurality of rigid supporting arms and ball joints to achieve the sideway function, therefore leading to a much more complex structure.

SUMMARY OF THE INVENTION

A primary object of the present invention is to provide an office chair in three dimensions that has the features of the original application and further allows sideway movements and lying backwards in every angle, so as to provide a comfortable seating.

To achieve the objects mentioned above, the present invention comprises a one-piece chair frame and an adjusting apparatus; wherein said chair frame is made of resilient composite plastic materials, including: a middle axle seat with a combination hole arranged beneath and a first convexity at rear; a plurality of supporting arms in arc shape, each extending upwards from said middle axle seat as a claw under; a seat frame formed on the top of each supporting arms with a front frame, a rear frame, a left frame, and a right frame, defining a first quadrant and a second quadrant at the front thereof, and a third quadrant and a fourth quadrant at the rear thereof from the middle axle seat as the center, where an empty space is arranged between the rear thereof and the middle axle seat, and a left tractional element and a right tractional element extend from the corresponding left and right frame, downwards and then inwardly extending to connect to the rear frame, defining a symmetrical structure in curves; a second convexity arranged in the middle of said seat frame at the rear thereof, corresponding to said first convexity; a one-piece back frame formed by extending upwards from the rear of the seat frame; two armrests extending upwards from the corresponding left and right side of said seat frame, on top of each a flat surface is formed, and each flat surface further extends to said back frame so as to complete the structure of said chair frame; and wherein said adjusting apparatus includes a first tube, a second tube, and a spring arranged inside said first and second tube as the first and second tubes being coupled and able to displace axially with a first socket on a first top corresponding to said first convexity whereby said first top fitting the bottom of said first tube, and a second socket on a second top corresponding to said second convexity whereby said second top fitting the top of said second tube, thereby enabling the first and second tube to stretch axially by the spring inside and therefore engaging said first and second socket with said first and second convexity, so as to provide elastic support to said seat frame and back frame whenever the spring is pressed by the movements of back frame and then adjusts the angle by having the first and second convexity revolving around the first and second sockets; whereby the back frame and the seat frame can adjust the angle from the middle axle seat, allowing sideway movements of the chair and lying backwards of the back frame.

As structures disclosed above, the present invention has the features of the original application as easily assembled and light-weighted. With the adjusting apparatus, the back frame thereof can adjust the angle for a user to lie face up, featuring the present invention an ergonomic design. Furthermore, the resilience of the materials and the design of exercise physiology also enable sideway movements in three-dimensional angles, featuring the present invention an even more comfortable seating.

DETAILED DESCRIPTION OF THE PREFERRED EMBODIMENT

Figure 1A:
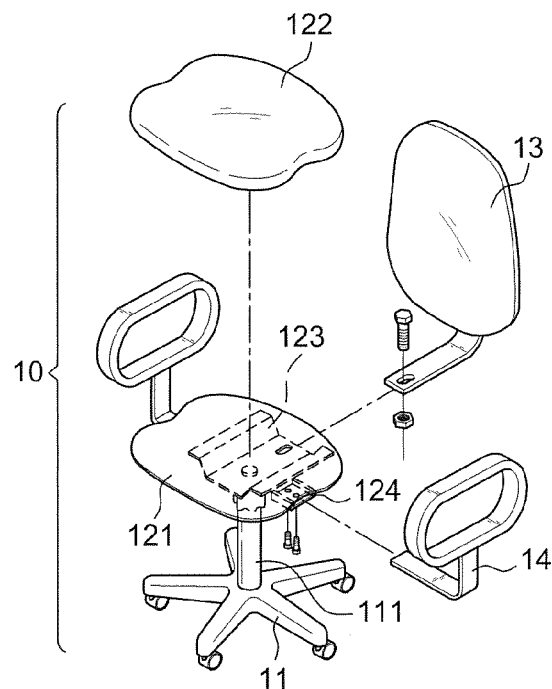
FIG. 1A is an exploded view of a conventional office chair.
Figure 1B:
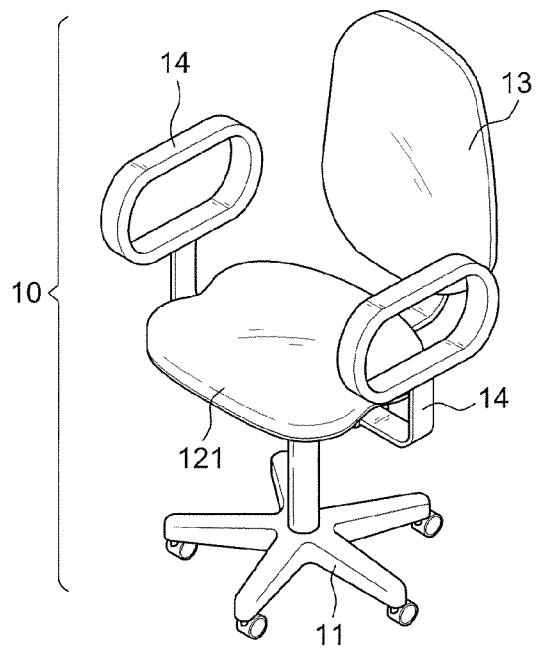
FIG. 1B is an exploded view of a conventional office chair.
Figure 2A:
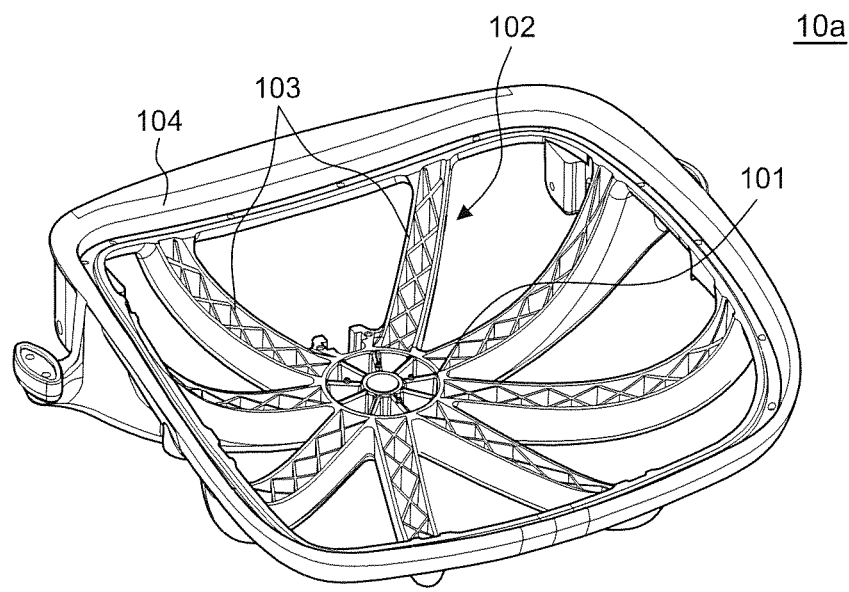
FIG. 2A is a perspective view of the structure disclosed in U.S. Pat. No. 7,887,138.
Figure 2B:
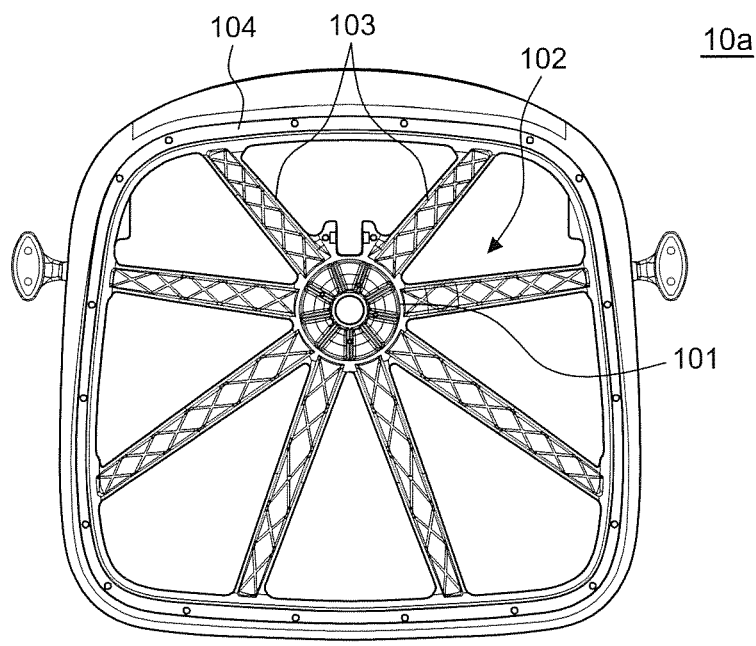
FIG. 2B is a top plan view of the structure disclosed in U.S. Pat. No. 7,887,138.

Referring to FIGS. 3-11, in a preferred embodiment, the present invention, a one-piece office chair in three dimensions 100, comprises a one-piece chair frame 70 and an adjusting apparatus 60.

The chair frame 70 is made of resilient composite plastic materials, including a middle axle seat 20, a plurality of supporting arms 30, a seat frame 40, a second convexity 46, a back frame 50, and two armrests 56.

The middle axle seat 20 has a combination hole 21 arranged beneath and a first convexity 22 at rear. Each of the supporting arms 30 is in arc shape and extending from the middle axle seat 20 as a claw under. In this embodiment, the combination hole 21 of the middle axle seat 20 is to be mounted into an under-frame column 23 of an office chair.

Referring to FIGS. 5A-5C and 10A-10B, the seat frame 40 is formed on the top of each supporting arms 30. In view of FIG. 10A, the seat frame 40 has a front frame 40a, a rear frame 40b, a left frame 40c, and a right frame 40d, defining a first quadrant and a second quadrant at the front thereof (above line y-y), and a third quadrant and a fourth quadrant at the rear thereof (below line y-y) from the middle axle seat 20 as the center, where an empty space 41 is arranged between the rear thereof and the middle axle seat 20, and a first concave groove 42 is arranged on the seat frame 40. Also, there is a left tractional element 45L and a right tractional element 45R extend from the corresponding left and right frame 40c, 40d, downwards and then inwardly extending to connect to the rear frame 40b, defining a symmetrical structure in curves. The left tractional element 45L and a right tractional element 45R are in a shape of a curved hand that have a function of mutual traction, enabling the seat frame 40 to recover back to the normal status with the resilience of the materials after sideway movements.

The second convexity 46 is arranged in the middle of the seat frame 40 at the rear thereof, corresponding to the first convexity 22.

The one-piece back frame 50 is extending upwards from the rear of the seat frame 40. In the embodiment, the back frame 50 has a supporting rib 51 as part of the one-piece chair frame 70 with a second concave groove 52 arranged thereon.

The armrests 56 are extending upwards from both left and right sides of the seat frame 40, on top of each a flat surface 57 is formed as well, and each flat surface 57 further extends to the back frame 50 so as to complete the structure of the chair frame 70.

Figure 3:
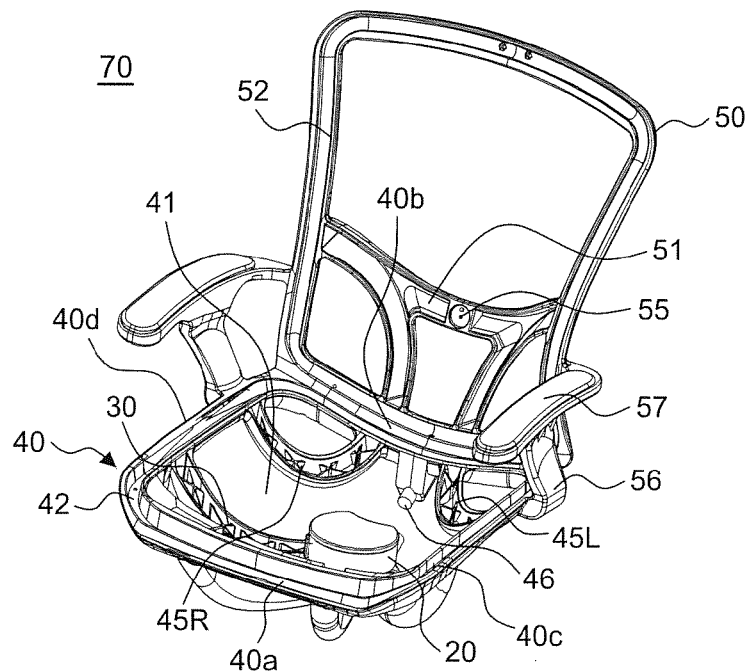
FIG. 3 is a perspective view of the one-piece structure of the present invention.
Figure 4:
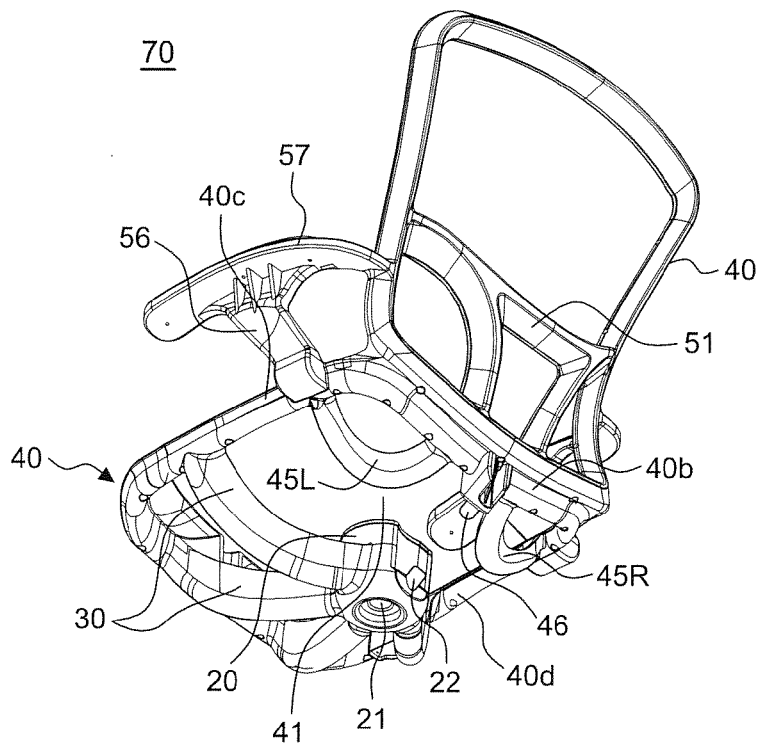
FIG. 4 is a perspective view of FIG. 3 from a different angle.
Figure 5A:
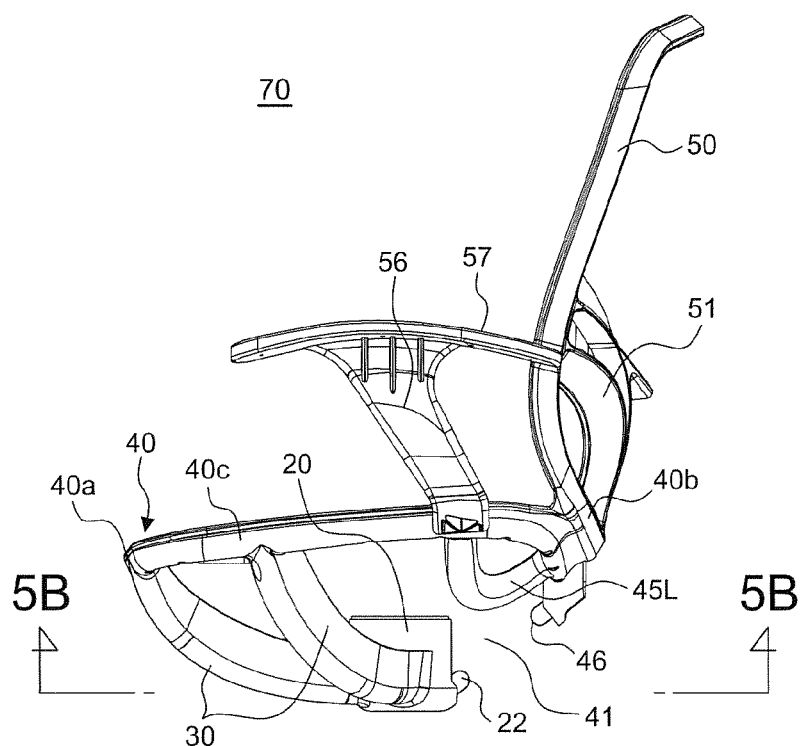
FIG. 5A is a left side elevation view of FIG. 3.
Figure 5B:
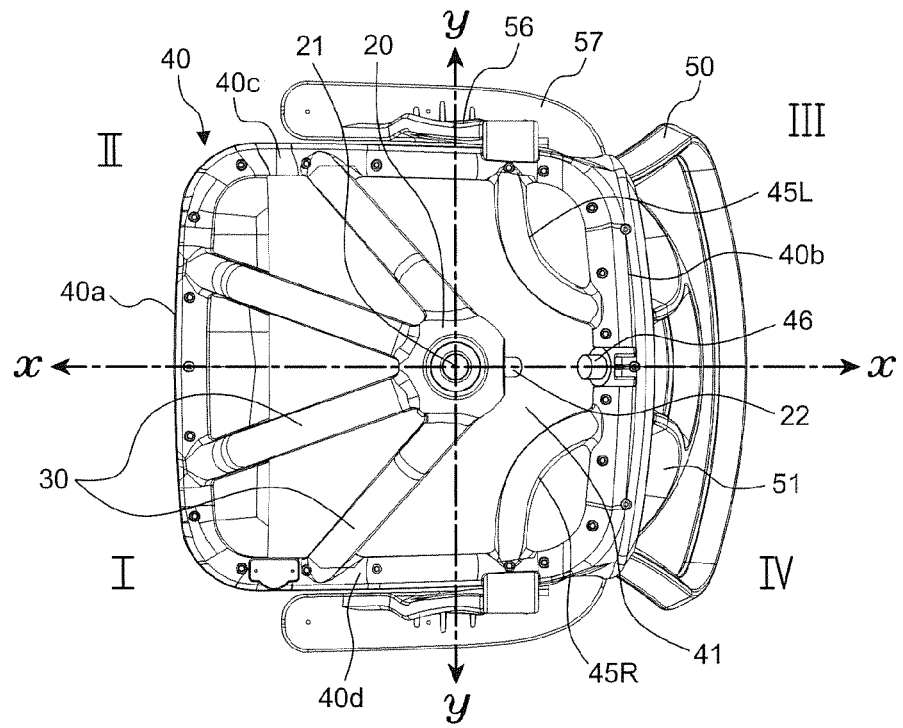
FIG. 5B is a bottom plan view of FIG. 3.
Figure 5C:
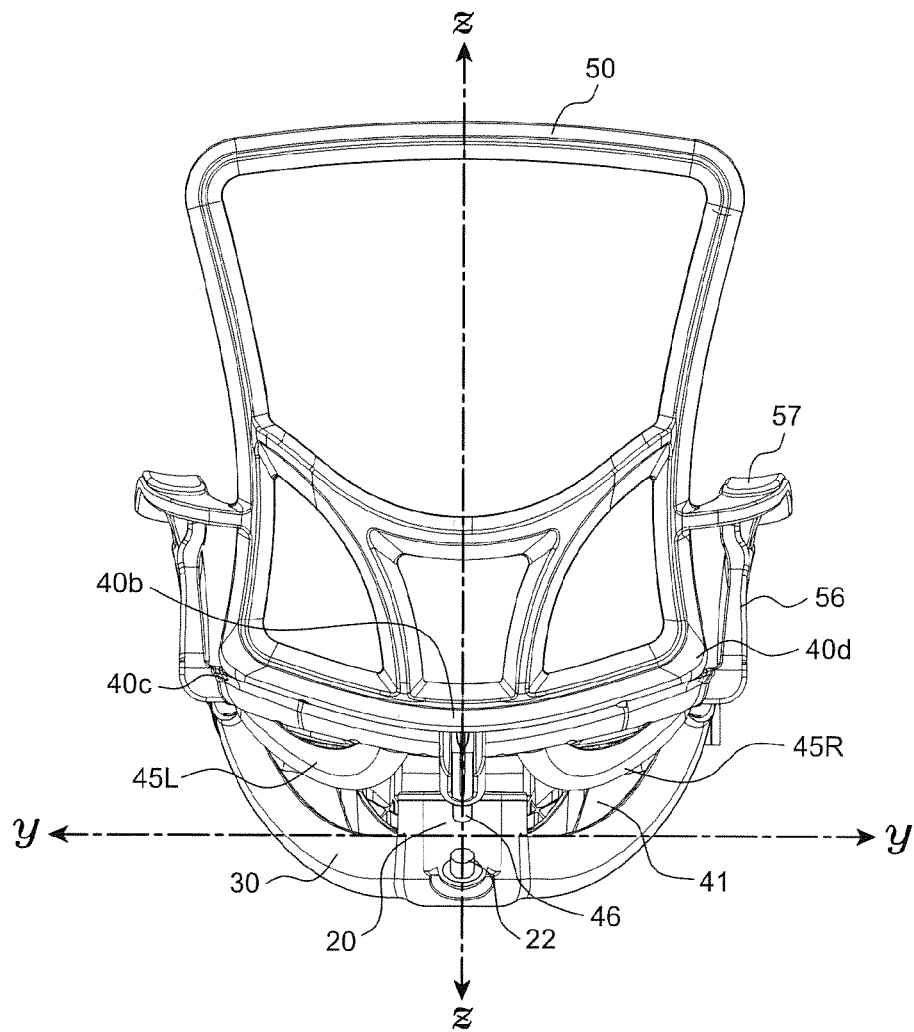
FIG. 5C is a rear elevation view of FIG. 3.
Figure 6:
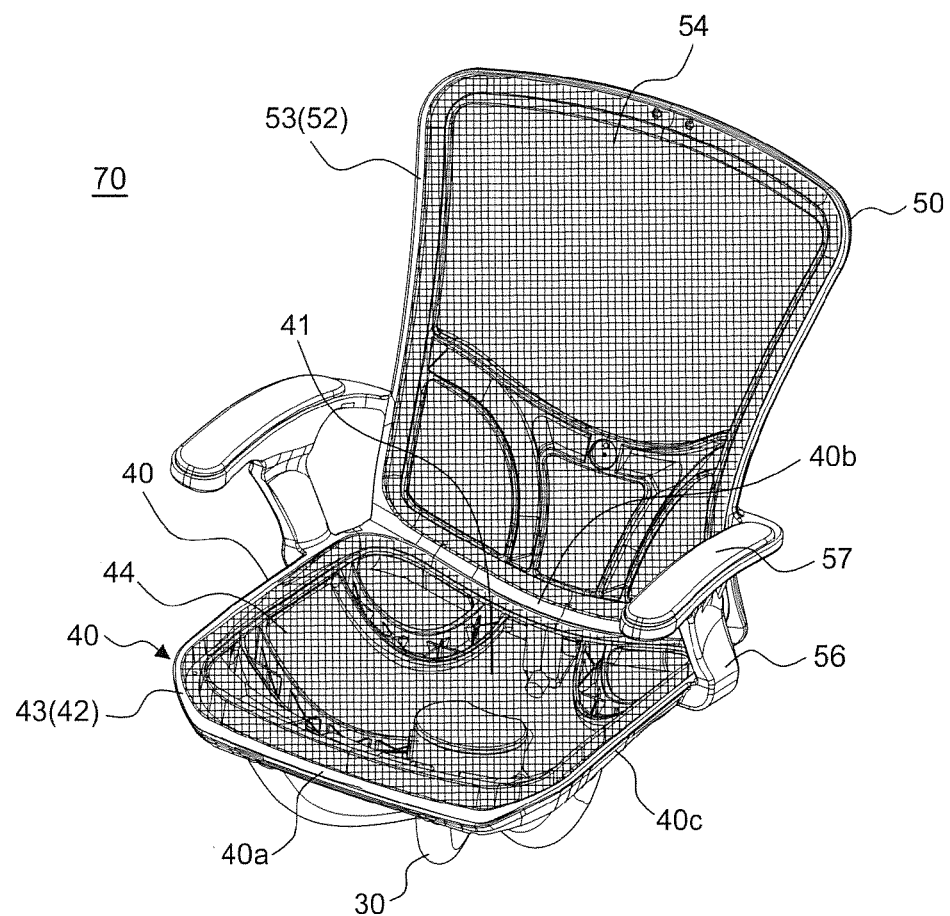
FIG. 6 is a perspective view of the present invention combining the one-piece structure with the seat pad and the backrest.

Further referring to FIGS. 3 and 6, a first annular loop 43 is arranged to engage the first concave groove 42 on the seat frame 40 in order to fix the fringe of a seat pad 44 therein, and a second annular loop 53 is arranged to engage the second concave groove 52 on the back frame 50 in order to fix the fringe of a backrest 54 therein. In the embodiment the seat pad 44 and the backrest 54 are made of nets but the present invention is not limited to such application. Cloth, plastic, or any of the combination is also applicable.

Figure 8:
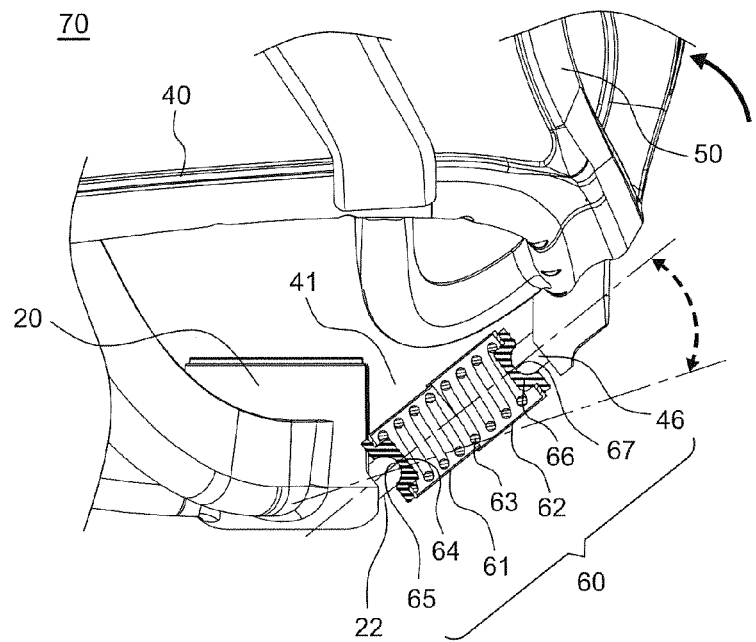
FIG. 8 is a partial cross-section view of the present invention illustrating the stretching of the spring when the seat back moves forward.
Figure 9:
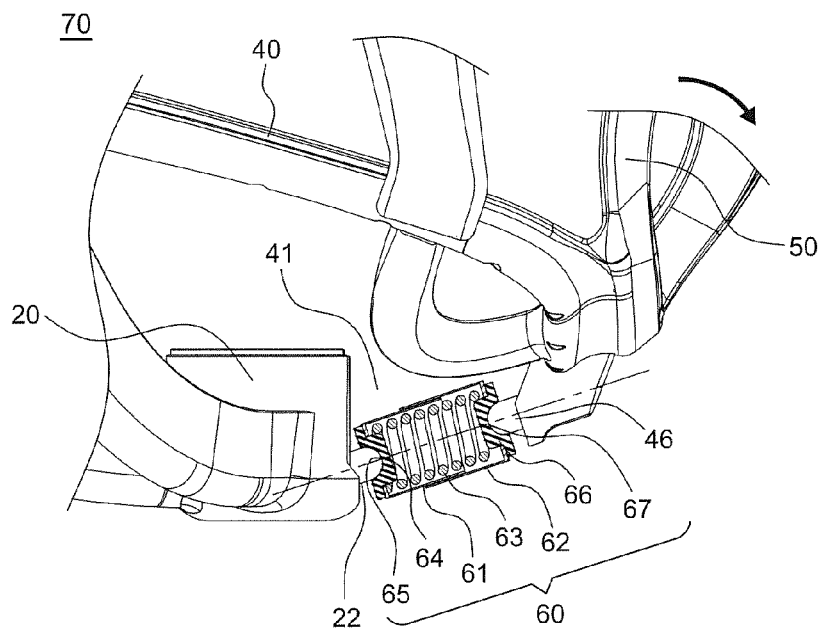
FIG. 9 is a partial cross-section view of the present invention illustrating the contracting of the spring when the seat back moves backwards.
Figure 10A:
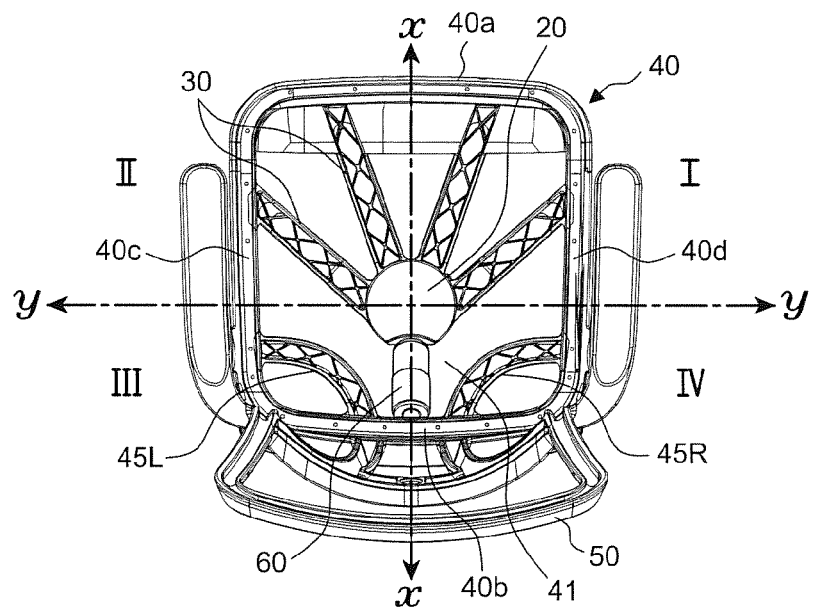
FIG. 10A is a bottom plan view of the present invention.
Figure 10B:
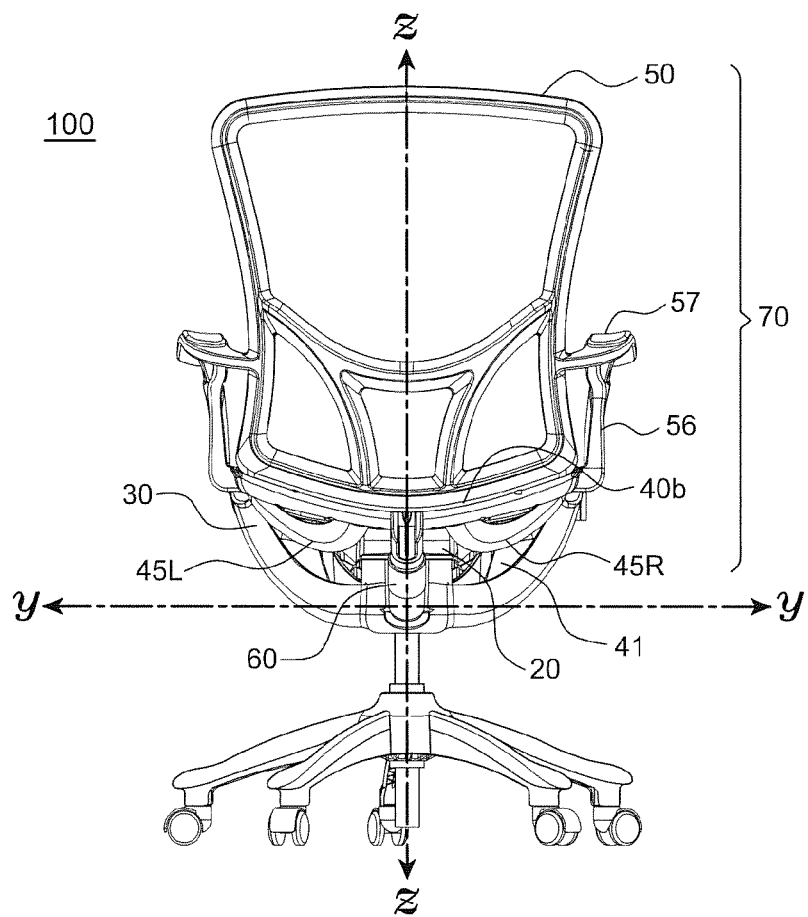
FIG. 10B is a rear elevation view of the present invention.

Apart from the one-piece frame structure, the present invention further has an adjusting apparatus 60 providing supports and elasticity for the chair frame. As shown in FIGS. 8 and 9, the adjusting apparatus 60 includes a first tube 61, a second tube 62, and a spring 63 inside the first and second tube 61, 62. The first and second tube 61, 62 are mutually coupled and able to displace axially with a first socket 65 on a first top 64 corresponding to the first convexity 22 whereby the first top 64 fits the bottom of the first tube 61, and a second socket 67 on a second top 66 corresponding to the second convexity 46 whereby the second top 66 fits the top of the second tube 62, thereby enabling the first and second tube 61, 62 to stretch axially by the spring 63 inside and therefore engaging the first and second socket 65, 67 with the first and second convexity 22, 46, so as to provide elastic support to the seat frame 40 and the back frame 50 whenever the spring 63 is pressed by the movements of back frame 50, and then adjusting the angle by having the first and second convexity 22, 46 revolving around the first and second sockets 65, 67. In FIG. 8, the spring 63 of the adjusting apparatus 60 is stretching axially when the back frame 50 moves forward, and in FIG. 9, the spring 63 is contracting axially when the back frame 50 moves backwards.

Since the chair frame 70 of the present invention is made of composite plastic materials with resilience, and there are supports from the adjusting apparatus 60, the present invention is therefore a steady and comfortable chair in the office.

Figure 7:
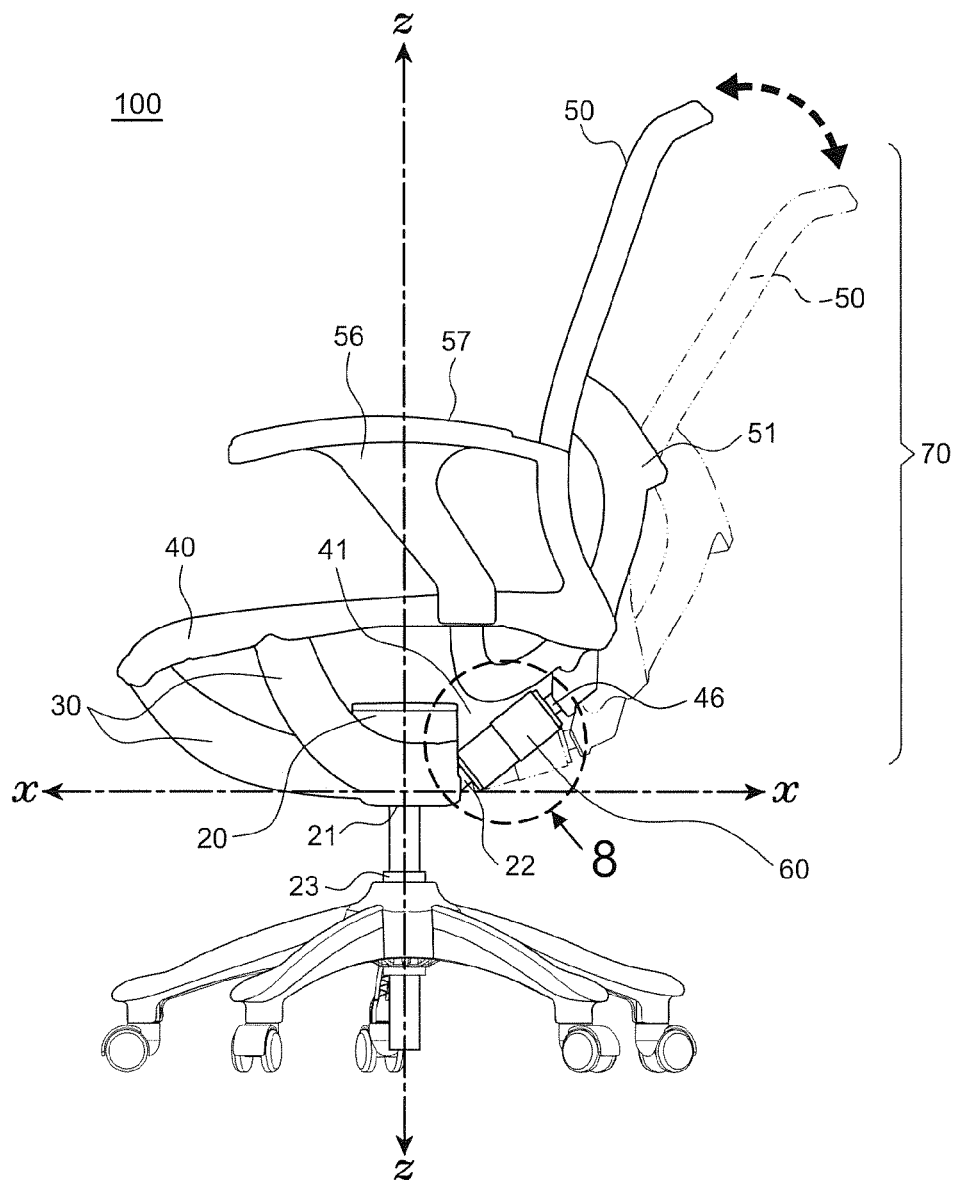
FIG. 7 is a schematic diagram of the present invention.
Figure 11:
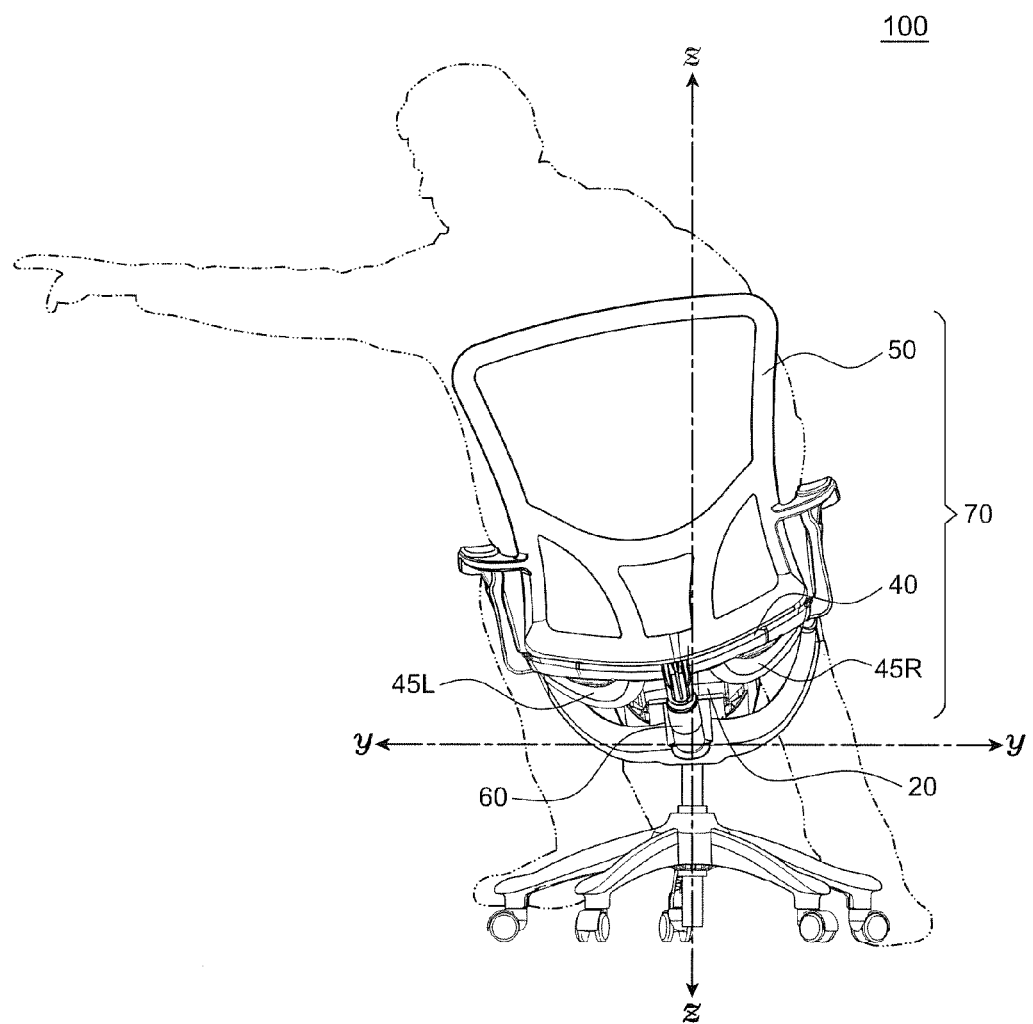
FIG. 11 is a practical application view of the present invention.

More importantly, the present invention is designed in view of ergonomics and exercise physiology to apply a dynamic design with the resilience of the materials. It allows the back frame 50 to lie backwards as shown in FIG. 7, and further allows sideway movements as shown in FIG. 11 with the design of the left tractional element 45L, the right tractional element 45R, and the empty space 41 between the rear section of the seat frame 40 and the middle axle seat 20 without any supporting arms so that the back frame 50 and the seat frame 40 would adjust the angle from the middle axle seat 20, achieving a comfortable seating in three-dimensional movements.

In conclusion, the present invention has the dynamic structure supporting the one-piece chair frame 70 for applying to resilient composite plastic materials, so as to achieve three-dimensional movements. Without the dynamic structure, the one-piece chair frame 70 would not be able to recover to the original shape even when made of materials with resilience. Therefore, the vital elements of the present invention includes the one-piece structure made of resilient composite plastic materials, the empty space 41 between the rear section of the seat frame 40 and the middle axle seat 20 without any supporting arms, the left tractional element 45L, the right tractional element 45R, and the adjusting apparatus 60. In other words, the present invention has additional functions of sideway movements which involve more complex techniques comparing to the original application and feature as a more flexible and adjustable chair in the office.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A one-piece office chair in three dimensions, comprising a one-piece chair frame and an adjusting apparatus;

wherein said chair frame is made of resilient composite plastic materials, including:
a middle axle seat with a combination hole arranged beneath and a first convexity at rear;
a plurality of supporting arms in arc shape, each extending upwards from said middle axle seat as a claw under;
a seat frame formed on the top of each supporting arms with a front frame, a rear frame, a left frame, and a right frame, defining a first quadrant and a second quadrant at the front thereof, and a third quadrant and a fourth quadrant at the rear thereof from the middle axle seat as the center, where an empty space is arranged between the rear thereof and the middle axle seat, and a left tractional element and a right tractional element extend from the corresponding left and right frame, downwards and then inwardly extending to connect to the rear frame, defining a symmetrical structure in curves;
a second convexity arranged in the middle of said seat frame at the rear thereof, corresponding to said first convexity;
a one-piece back frame formed by extending upwards from the rear of the seat frame;
two armrests extending upwards from the corresponding left and right sides of said seat frame, on top of each a flat surface is formed, and each flat surface further extends to said back frame so as to complete the structure of said chair frame; and
wherein said adjusting apparatus includes a first tube, a second tube, and a spring arranged inside said first and second tube as the first and second tube being mutually coupled and able to displace axially with a first socket on a first top corresponding to said first convexity whereby said first top fitting the bottom of said first tube, and a second socket on a second top corresponding to said second convexity whereby said second top fitting the top of said second tube, thereby enabling the first and second tube to stretch axially by the spring inside and therefore engaging said first and second socket with said first and second convexity, so as to provide elastic support to said seat frame and back frame whenever the spring is pressed by the movements of back frame and then adjusts the angle by having the first and second convexity revolving around the first and second sockets;
whereby the back frame and the seat frame can adjust the angle from the middle axle seat, allowing sideway movements of the chair and lying backwards of the back frame.

2. The one-piece office chair in three dimensions as claimed in claim 1, wherein a first annular loop is arranged to engage a first concave groove on the seat frame in order to fix the fringe of a seat pad into said first concave groove, and a second annular loop is arranged to engage a second concave groove on the back frame in order to fix the fringe of a backrest into said second concave groove.

3. The one-piece office chair in three dimensions as claimed in claim 2, wherein said seat pad and backrest are made of nets, cloth or plastic, or a combination of these materials.

4. The one-piece office chair in three dimensions as claimed in claim 2, wherein said back frame has a supporting rib formed together in one-piece.

5. The one-piece office chair in three dimensions as claimed in claim 4, wherein said elastic apparatus comprises a spring and two coupled tubes and connects the front to the back of said lumbar support, enabling the lumbar support to pivots and thus adjusts the angle.

6. The one-piece office chair in three dimensions as claimed in claim 1, wherein the combination hole of said middle axle seat is to be mounted into an under-frame column of an office chair.

\* \* \* \* \*